United States Patent [19]

Von Statten, Jr.

[11] 4,109,105
[45] Aug. 22, 1978

[54] EARPHONE MOUNTING IN SAFETY HELMET FOR MOTORCYCLE RIDERS

[76] Inventor: Richard J. Von Statten, Jr., 211 Chicory La., Buffalo Grove, Ill. 60090

[21] Appl. No.: 765,927

[22] Filed: Feb. 7, 1977

[51] Int. Cl.² .............................................. H04B 1/38
[52] U.S. Cl. ........................... 179/1 VE; 179/182 R; 325/16; 325/361
[58] Field of Search .................. 179/1 VE, 1 E, 1 G, 179/1 GA, 182 R, 111 R; 330/16; 325/16, 310, 361

[56] References Cited

U.S. PATENT DOCUMENTS

| 2,904,645 | 9/1959 | Sarles | 325/361 |
| 3,021,526 | 2/1962 | Lastnik | 179/182 R |
| 3,430,146 | 2/1969 | Chua | 179/111 R |
| 3,586,977 | 6/1971 | Lustig | 325/16 |
| 3,916,312 | 10/1975 | Campbell | 325/16 |

FOREIGN PATENT DOCUMENTS 2,231,164 12/1974 France ...................................... 325/16

Primary Examiner—Thomas W. Brown
Assistant Examiner—E. S. Kemeny
Attorney, Agent, or Firm—Robert D. Farkas

[57] ABSTRACT

A sound producing helmet for motorcycle riders utilizes a pair of speakers, each secured within an opening in the lining of a motorcycle helmet. A cloth-like screen is secured to the exposed surface of the lining covering the opening. A wire-like screen and a resilient pad may be interposed between each speaker and the cloth-like screen, providing further protection to the active surface of the speaker and the user of the helmet, if desired. Each speaker is connected to a female receptacle secured within openings in the helmet. An extensible cable is provided with a pair of plugs, each adapted to be inserted into the female receptacles and each carrying one channel of a stereophonic audio voltage signal coupled into the cable by utilizing a multi-terminal plug adapted for insertion into a receptacle attached to a magnetic tape playback device attached to the body of a motorcycle.

6 Claims, 3 Drawing Figures

U.S. Patent  Aug. 22, 1978  4,109,105
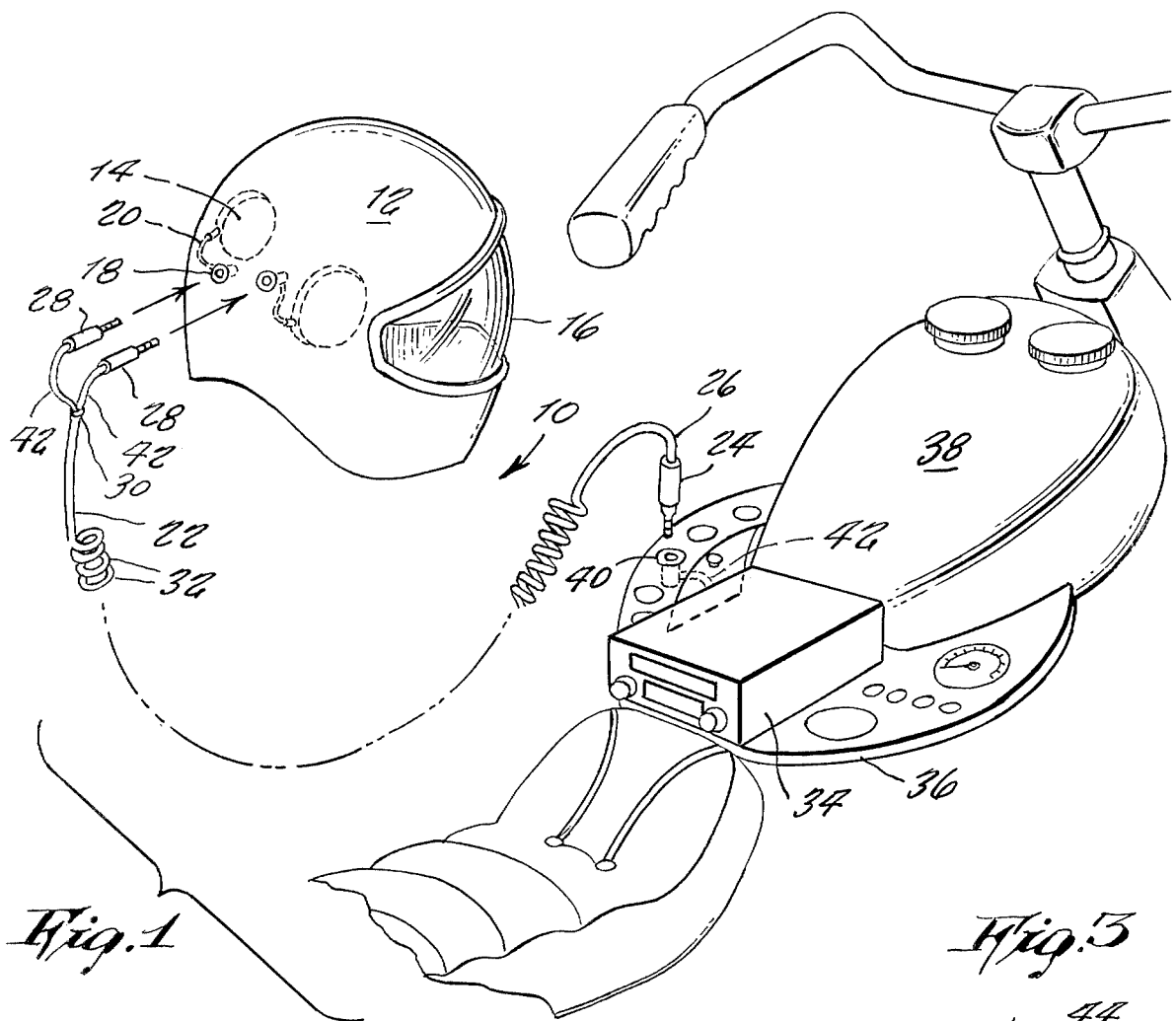
Fig.1
Fig.3
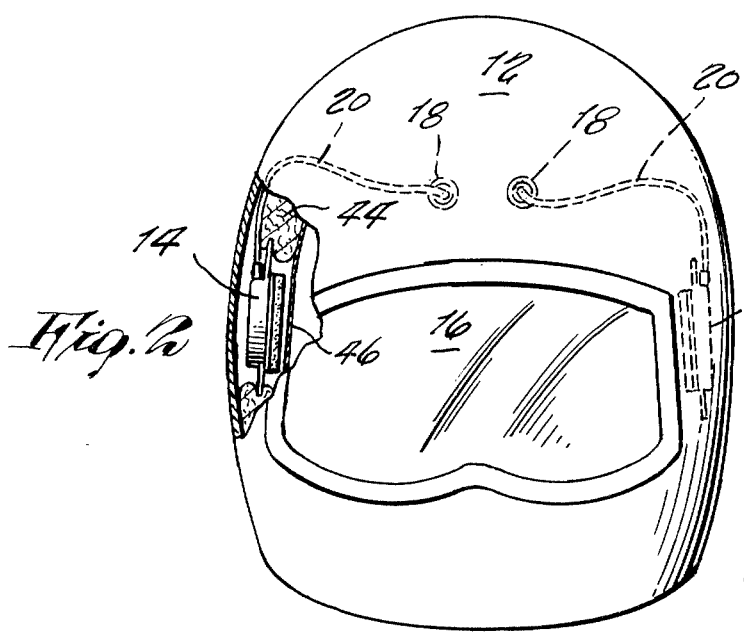
Fig.2
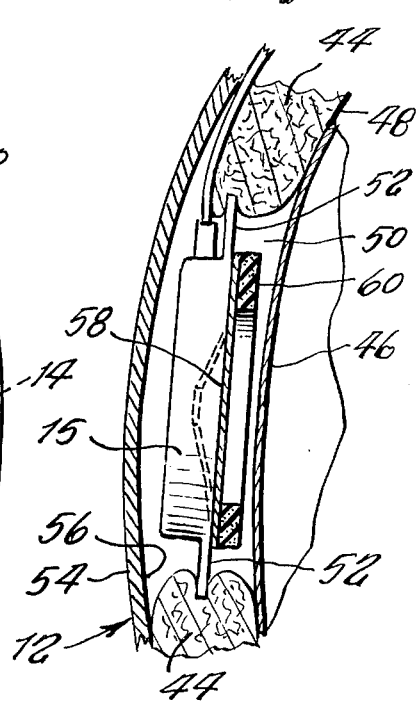

EARPHONE MOUNTING IN SAFETY HELMET FOR MOTORCYCLE RIDERS

BACKGROUND OF THE INVENTION

1. Field of the Invention

This invention relates to portable communication devices and more particularly to that class of apparatus which produces sound whilst providing protection to the head of the user.

2. Description of the Prior Art

The prior art abounds with sound producing helmets. U.S. Pat. No. 2,904,645 issued on Sept. 15, 1959 to G. A. Sarles teaches a radio device adapted to be attached to a head protecting helmet. The earphone portion of the apparatus is detachably engaged to the structural part of the helmet having portions of the earphone protected by a resilient rubber-like pad.

U.S. Pat. No. 3,586,977 issued on June 22, 1971 to H. V. Lustig wherein the disclosure describes a system providing voice intercommunication between a motorcycle rider and a passenger when both are wearing motorcycle helmets. The system employs a transistor radio with switching means to enable it to be used selectively for intercommunication purposes and for receiving radio broadcasts. The speaker portion of the apparatus is fixedly secured to the interior portion of the helmet.

U.S. Pat. No. 3,916,312 issued on Oct. 28, 1975 to W. L. Campbell teaches an improved portable voice communication device which comprises a speaker-microphone unit having a transducer-speaker disposed in a sealed housing and an elongated acoustical pick-up tube and an ear funnel communicating with opposite sides of the speaker and projecting from the housing. A radio transceiver is disposed in a second separate housing. The transceiver's signal converting section is electrically linked to the speaker-microphone unit through an elongated cable. Anchoring means attached to the exterior of the first housing adjacent the ear funnel cooperate therewith for releasably securing that housing in place adjacent the ear and mouth of the user on a helmet or headpiece. Pivoting or other movement of the first housing relative to the support device is prevented by the projecting ear funnel which engages an opening on the headwear.

All of the aforementioned patents suffer the common deficiency of utilizing speaker devices either projecting inwardly or outwardly from the innermost or outermost surfaces of the helmet thereby providing either a minimum amount of protection for the speaker device or in permitting such speaker devices to easily come into contact with portions of the user's body.

SUMMARY OF THE INVENTION

A primary object of the present invention is to provide a stereophonic sound producing apparatus safely ensconced within the lining of a motorcycle helmet.

Another object of the present invention is to provide a cable detachably coupling audio voltage signals to the helmet utilizing individual channel receptacles therefor.

Still another object of the present invention is to provide a cable which is extensible in character, coupling the audio voltage signals from an output receptacle of a magnetic type cartridge playback device mounted to a motorcycle.

Yet another object of the present invention is to provide a wire-like screen and rubber-like pad which further protects the user's head and the speaker apparatus from injury.

The present invention provides a motorcycle helmet which may be utilized solely to protect the head of the user or if desired, to additionally provide two separate sound signals within the interior of the helmet. The detachable cable may be electrically coupled to female input receptacles, secured to the helmet, that are coupled electrically to the speakers. Thus, the helmet may be employed without the cable or with the cable, upon those occasions that the speaker systems are electrically activated by energizing the cable with a pair of audio voltage output signals produced by a magnetically operated cartridge playing device mounted to the motorcycle frame. The cable may be detached from the cartridge playing device for convenient isolated storage, when not in use.

These objects as well as other objects of the present invention, will become more readily apparent after reading the following description of the accompanying drawings.

BRIEF DESCRIPTION OF THE DRAWINGS

FIG. 1 is a perspective view of the present invention.

FIG. 2 is a front elevation view of the present invention.

FIG. 3 is a side elevation cross-sectional view of a portion of the present invention.

DESCRIPTION OF THE PREFERRED EMBODIMENT

The structure and method of fabrication of the present invention is applicable to a motorcycle helmet to which is affixed in the interior portions thereof a resilient lining. A pair of openings within the lining house a pair of speakers fixedly secured to the lining. A cloth-like screen is secured to the exposed portion of the lining covering the openings in which the speakers are ensconced. Each speaker is electrically coupled to a pair of female receptacles passing through openings in the occipital posterior portion of the helmet to which they are affixed. An electrical cable having a multi-terminal plug attached to one end is energized by stereophonic audio voltage signals provided by an audio voltage signal generating device, such as a cassette cartridge playback device mounted on the frame of a motorcycle. The other end of the cable is bifurcated into two cable branches, each adapted with a monophonic coupling plug wherein each plug carries one channel of audio voltage signal when the cable is suitably electrically energized. The pair of monophonic plugs are adapted for insertion within female receptacles carried by the helmet.

Further physical protection may be afforded to the speaker devices and to the head of the user, utilizing the helmet, by affixing a wire-like screen to the surface of the speaker, or if desired, by affixing a resilient-like rubber-like pad to the stationary portions of the speaker adjacent the cloth-like screen, or both.

Now referring to the figures, and more particularly to the embodiment illustrated in FIG. 1 showing the present invention 10 comprising a motorcycle helmet 12 in which a pair of speakers 14 are installed. Transparent visor 16 provides visual access for the head of the user when inserted within helmet 12. Female receptacles 18 are electrically coupled to speakers 14 utilizing wires 20 therefor. Electrical cable 22 has multi-terminal plug 24 attached to end 26 thereof. Plugs 28 are attached to bifurcated end 30 of cable 22. A plurality of adjacent turns 32 are formed along a portion of the length of cable 22 facilitating the convenient extension and retraction in length of the cable. Cassette type cartridge tape player 34 is shown mounted on a portion of frae 36 of motorcycle 38, having its output signal coupled to an output receptacle 40, utilizing connecting cable 42 therefor. Stereophonic audio voltage signals are injected into cable 22, as produced by tape player 34, when plug 24 is inserted into output receptacle 40. Ends 42 of cable 22 each carry a monophonic audio voltage signal due to the divergence of the individual conductors present at end 26 into each of ends 42. Such monophonic audio voltage signals are individually coupled to each speaker 14 when plugs 28 are inserted into female receptacles 18.

FIG. 2 illustrates helmet 12 to which speakers 14 are secured within the resilient lining 44 of the helmet. Cloth-like screen 46 is shown attached to the exposed surface 48 of lining 44 covering speaker 14.

FIG. 3 shows the outermost shell 54 of helmet 12 having resilient lining 44 attached to surface 56 thereof. Opening 50 in resilient lining 44 partially encloses speaker 14, housed therewithin. Flange 52 extends radially outwardly from speaker 14 and is secured to resilient lining 44, such as by the use of an adhesive, not shown. Cloth-like screen 46 is shown covering opening 50 and the interior surface 48 of resilient lining 44. Wire-like screen 58 may be installed covering the innermost surface of speaker 14 so as to provide additional mechanical protection to the speaker. Rubber-like padding 60 is shown adhered to the innermost surface of wire-like screen 58 and adjacent to the portion of cloth-like screen 46 covering opening 50.

One of the advantages of the present invention is a stereophonic sound producing apparatus safely ensconced within the lining of a motorcycle helmet.

Another advantage of the present invention is a cable detachably coupling audio voltage signals to the helmet utilizing individual channel receptacles therefor.

Still another advantage of the present invention is a cable which is extensible in character, coupling the audio voltage signals from an output receptacle of a magnetic type cartridge playback device mounted to a motorcycle.

Yet another advantage of the present invention is a wire-like screen and rubber-like pad which further protects the user's head and the speaker apparatus from injury.

Thus there is disclosed in the above description and in the drawings, an embodiment of the invention which fully and effectively accomplishes the objects thereof. However, it will become apparent to those skilled in the art, how to make variations and modifications to the instant invention. Therefore this invention is to be limited, not by the specific disclosure herein, but only by the appending claims.

The embodiment of the invention in which an exclusive privilege or property is claimed are defined as follows:

1. In a motorcycle having a magnetic cartridge playback device mounted thereto, the playback device producing two audio voltage signals, the playback device having an output receptacle to which the two audio voltage signals are coupled, the improvement comprising:

a cable, one end of said cable having a first plug for removable insertion into said output receptacle, the other end of said cable being bifurcated into two cable branches, the free ends of the branches being electrically coupled to two second plugs, the first plug coupling said two audio voltage signals into said cable, each of the two second plugs being electrically coupled to one of said two audio voltage signals, a motorcycle helmet, said helmet having a resilient rubber-like lining affixed to the interior portions thereof, a pair of speakers, each of said pair of speakers fixedly secured within an opening in said lining, a cloth-like screen, said screen fixedly secured to the exposed surface of said lining covering said opening, a pair of input receptacles, said pair of input receptacles fixedly secured to said helmet, said pair of input receptacles for removable insertion of said two second plugs therein, said two second plugs electrically coupling the two audio voltage signals to said pair of input receptacles, and means to electrically couple said two audio voltage signals from said pair of input receptacles to said pair of speakers.

2. The improvement as claimed in claim 1 further comprising a wire-like screen, said wire-like screen fixedly secured to said pair of speakers at a location intermediate said pair of speakers and said cloth-like screen.

3. The improvement as claimed in claim 1 further comprising a resilient rubber-like padding, said padding being fixedly secured to said pair of speakers intermediate said pair of speakers and said cloth-like screen.

4. The improvement as claimed in claim 1 further comprising a resilient rubber-like padding, said padding fixedly secured to said wire-like screen at a location intermediate said wire-like screen and said cloth-like screen.

5. The improvement as claimed in claim 1 wherein said cable comprises a plurality of helical coil-like turns disposed along a portion of the length thereof.

6. The improvement as claimed in claim 1 wherein said pair of input receptacles pass through openings located in the interior central portion of said helmet.

* * * * *